United States Patent [19]

Jensen et al.

[11] 4,148,505
[45] Apr. 10, 1979

[54] AUTOMOBILE BODY COLLISION ENERGY ABSORBING SYSTEM

[76] Inventors: Donald W. Jensen, 300 E. 40th, Apt. 11M, New York, N.Y. 10016; Addison S. Beckley, 48 Baltusrol Way, Short Hills, N.J. 07078

[21] Appl. No.: 902,739

[22] Filed: May 3, 1978

Related U.S. Application Data

[63] Continuation of Ser. No. 761,898, Jan. 24, 1977, abandoned.

[51] Int. Cl.² ............................................. B62D 21/00
[52] U.S. Cl. ...................................................... 280/784
[58] Field of Search .................... 280/784; 213/43, 45; 267/139; 296/28 R

[56] References Cited

U.S. PATENT DOCUMENTS

| | | | |
|---|---|---|---|
| 3,216,593 | 11/1965 | Reuter et al. .......................... 213/45 |
| 3,633,934 | 1/1972 | Wilfert ................................. 280/784 |
| 3,888,502 | 6/1975 | Felzer et al. ......................... 280/784 |
| 3,891,224 | 6/1975 | Casey et al. .......................... 280/784 |

*Primary Examiner*—Richard A. Bertsch

[57] ABSTRACT

Collision impact energy-absorbing system for automobiles wherein the front and rear ends of the vehicle are structured into two stages or low and high speed plastic cellular modules such as foam. The impact modules are controlled by a combination of outer plastic skins and bulkheads. The system is designed to maximize the body crush or deceleration distance in order to minimize the "G" loads on the secondary crush zone and passenger compartment during head-on and oblique frontal and rear collisions. The system distributes kinetic energy over as wide an area and as evenly as possible through predetermined transmission paths through the system and into the stronger and heavier parts of the vehicle inner body and chassis structure.

32 Claims, 23 Drawing Figures

AUTOMOBILE BODY COLLISION ENERGY ABSORBING SYSTEM

This is a continuation of application Ser. No. 761,898, filed Jan. 24, 1977, now abandoned.

BACKGROUND OF THE INVENTION

The invention relates to the field of collision shock absorbing systems and more particularly to a modular, two-stage, energy-absorbing system for improving the energymanagement effectiveness of the primary crush zone of a vehicle at speeds of from 5mph to about 30+mph for both direct and oblique collisions.

Those skilled in the art are aware of the problem that occupants of small cars involved in accidents suffer 30 to 40% higher injury and death rates compared to occupants in larger cars that weigh from 1,000 to 1,500 lbs more. This dangerous and costly reality will be aggravated as the auto industry seeks answers to long-term energy problems by emphasizing the small car in America over the next 10 to 20 years. The safety and security a large car offers to the buyer is not only psychological but is based on fact. A study of 23,000 highway accidents submitted during the July 1974 International Congress on automotive safety revealed an inverse relationship between car size and occupant injuries. In many types of accidents, injuries in smaller cars were double in number of those in fullsize cars.

The statistical evidence is further substantiated by a series of high-speed test crashes between large and small cars. Consumer buying habits reflect a number of considerations among which is found to be the crashworthiness of a vehicle as a predominate concern to the car owner. Repairs and insurance premiums are obviously also found to be costs of major concern. Thus crashworthiness is one important reason why the majority of car owners have always striven to own as large a car as possible.

Approximately one-fourth of American automobiles and over 30 million Americans are involved in auto accidents each year. More than 70% of U.S. auto accident injuries involve occupants. Over 80% of occupant injuries occur at impact speeds (Barrier Equivalent Velocity: BEV) below 40mph. More than 75% of accidents involve front and rear ends and corners of automobiles. Thirty-six percent of reported injuries and 60% of fatalities are above 30mph (BEV). Serious and fatal injuries on the average are 100% more frequent in small cars weighing under 2,900 lbs. This applies to both belted and unbelted occupants. Injuries in small cars striking each other average 75% more than in large cars striking each other. Crash data indicate that automobile weight differences alone have little net effect on overall injury rates. Airbag deployment problems are inherent in small cars. Crash data and tests indicate that small car injuries are aggravated by the automobile's short body crush deceleration distances which is the basic safety deficiency of the small car.

The automotive industry and research firms have devoted much time to reinforcing small cars to maintain passenger compartment structural integrity without changing the car body crush deceleration distance in frontal collisions. These experiments merely add weight to the vehicle while simultaneously imposing intolerably high "G" loads on the occupant (as shown by instrumented dummies in tests) as a result of strengthening the vehicle without adding more deceleration distance.

Tests conducted by the auto industry and the government show specifically how crush distance is a major factor in providing a ride down or deceleration distance for the occupant. In cases where occupants are using a belt, harness or airbag system the reduction in bodily injury in frontal collisions becomes directly proportional to the vehicle deceleration distance and its effectiveness in managing the collision energy over as long a stroke as possible through the vehicle body's primary and secondary crush zones. Accordingly, the effectiveness of any occupant interior restraint system is in direct proportion to the vehicle's crashworthiness and the ability of its exterior body to absorb collision energy. In small cars, the exterior body does not have sufficient energy absorbing capacity. The only way this basic safety deficiency can be solved without gas mileage penalties is to restore body crush distance with a light weight, energy management system. Over 50% of reported accidents involve the front and rear ends and corners of the vehicle and are above 10mph BEV. Forty percent are from 10 to 20mph. The average repair costs in a 15mph accident are now $1200 and rising. In many accidents, when the car is hit at 10 to 15mph in the corner at fender level, the fender will buckle well behind the impact area because the corner is stronger than the area behind thereby causing extensive damage. A stock fender being a one piece panel and not flexible thus aggravates the car's overall damageability factor.

In addition to these principal problems, there are other considerations. Energy conservation will require lighter weight and more efficient automobiles. The currently accepted methods of reducing weight in mass produced conventional vehicles will result in smaller cars with reduced effective body crush distances. The costs of collision repairs and bodily injuries are rising at a rate which is increasing insurance premiums to an impractical level without offering economical relief to the insurance industry or to the car owner. It has been stated that the "adverse problems" of solving vehicle crashworthiness and gas mileage efficiency were "extremely complex" and would require many years of research and many billions of dollars. Furthermore, existing government reports state that further advanced concepts for reducing collision repair costs above 10 are not available for evaluation. Federal laws call for a substantial decrease in collision repair costs and also give the Secretary of Transportation the authority to prevent cars from being delivered to the consuming public when they are deemed to have a basic safety deficiency. To date no solutions have been proposed to simultaneously reduce collision repair costs substantially while improving the crashworthiness of the vehicle and do so without affecting the gas mileage or mass production system for the economy car. The basic safety deficiency of small cars is now being aggravated in more types of vehicles including full size cars as front ends are shortened in attempts to save weight. This conventional approach also allows most collisions to penetrate into the expensive part of the vehicle.

Recent government tests dramatically show the basic safety deficiencies of the stock small economy car, particularly when colliding it with a full size car in simulated highway frontal collisions at speeds equivalent to 40 mph barrier equivalent velocity (BEV). After the collisions, the small cars had no room left for the driver. The instrumented dummy clearly indicated that at best any occupant restraint system would merely have turned a quick fatality into a permanent cripple. In collisions of small cars equipped with airbags, the bag does not fully deploy until 30 to 40% of the vehicle's already deficient crush distance is destroyed. The small stock car can be equipped with expensive radar sensing equipment to deploy the airbag early, but the cost of this type of system and other related factors is great. A passive restraint system still cannot provide the crashworthiness of the body crush distance found in larger cars.

The technology proposed by those skilled in the art (soft faces and five mph safety bumpers, etc.) cannot keep pace with the rising cost of collision repairs or reduce repair costs in ten to twenty mph collisions particularly at frontal angles. Current and planned mass produced economy cars, using the latest in materials and processing methods, have been declared by many experts as being incompatible with further improvements in vehicle crashworthiness. The proliferation of aggressive conventional bumper devices used to meet bumper standards have precluded the possibilities of overall solutions to crashworthiness and damageability from being developed and introduced into the market place.

The current problem facing the automotive industry is that even though bigger is safer, how can the consumer continue to be sold larger, prestigious looking automobiles, when gasoline mileage legislation and resource conservation are becoming critical problems. Furthermore, nothing of major importance in reducing accident damage costs and repair time is forthcoming. The direction of the industry has been further confirmed by statements to the effect that "we have reached the end of our safety technology", and "to expect improved collision damage protection at 15mph would be completely unreasonable," etc. are examples of recent testimony in Washington, D.C. opposed even to a continuance of 5mph bumper standards.

Among the prior art items to be considered are U.S. Pat. Nos. 3,702,711; 3,802,727; 3,721,433; 3,784,182; 3,610,609; 3,638,985; 3,794,342; 2,829,915; 3,224,924; 3,836,192; 3,224,924; 3,744,835; 3,888,502; 3,797,873; Great Brit. Pat. No. 1 068 434; Deutsches Auslegeschrift 1 923 305 (1970); and a paper entitled "Necessary Considerations in the Design, Analysis and Performance Assessment of Crashworthy Structures and Protective Systems" published in a book entitled "Measurement and Prediction of Structural and Biodynamic Crash-Impact Response" by the American Society of Mechanical Engineers, 1976.

SUMMARY OF THE INVENTION

The invention is directed to a modular, two stage crashworthiness system which employs a unique combination, disposition and arrangement of bulkheads, cellular materials and skins so as to control the energy of a collision impact to maximize the deceleration distance to reduce as much as possible the G loading on vehicle and occupants. The system includes a Stage 1 module of flexible foam or cellular material for low speed collision impacts which extends across substantially the full width of the car and in which an outer bulkhead and an enveloping skin control the reaction of the foam module. The primary energy absorbing is done by the foam with the skins serving to control the foam while distributing the energy and acting as the styling surface. The outer bulkhead receives the impact energy over as large a cross-sectional area as possible for transmission into the second stage module. The second stage cellular material or foam module includes a center foam section and two side or fender sections preferably rearwardly offset of the center section for corner or angular or oblique impacts. Each of the Stage 2 foam modules is backed up by a bulkhead, as a stabilizer bulkhead for the center foam section and fender well bulkheads for the side or corner foam sections. The Stage 2 or high speed foams are encased in skins for absorbing the energy or higher speed frontal and oblique or angular impacts.

Accordingly, it is among the many objects, features and advantages of the invention to provide a plastic safety conversion system for automobile bodies which reduces occupant injuries and also provides improved safety for pedestrians and cyclists. This system is capable of being styled to upgrade small cars and to give a quiet ride without penalizing the performance of the automobile or interferring with its gas mileage efficiency. This system is lightweight and yet provides effective collision crush distances and passenger compartment integrity equivalent to that of cars weighing 500 to 1200 pounds more. The system absorbs a great deal more kinetic energy than present so-called "safety" bumpers. It involves no inconveniences or maintenance costs and exceeds present proposed government safety standards for front and rear collisions. This modular system is effective for angle and offset collisions and reduces collision repair costs particularly at speeds ranging from 5 to 16mps (BEV). It insures quality control of body repairs and reduces the time a car is tied up for repairs. In most car-to-car frontal accidents up to 30mph with one car at rest, the collision performance is achieved without damage to the car's stock chassis, inner body, or mechanical components. It distributes the collision forces over a wide area and eliminates the need for sensor equipment in small cars equipped with airbags. It eliminates bumper override or underride problems in collisions. The retail price of the body conversion system in mass production volume is comparable to conventional so-called trim kits. The system is adaptable to existing as well as to new car production. It is particularly attractive because it requires no major changes in present inner bodies, chassis or mechanical components and all materials and processes for incorporating the system in a car are currently utilized by the automotive industry. As stated above, it is adaptable to present industry mass-production systems and marketing methods and current stock. Components such as metal fenders, bumpers, and grills may be deleted and the components of this invention installed on the production line. Alternatively they can be quickly installed at regional or dealer depots. Likewise, the components of this invention can be installed at import docks on imported foreign vehicles. Replacement parts sales can be maintained while reducing the time a car is in the shop. It enables custom bodies to be produced without interrupting present production line processes and is adaptable to small quantities of cars. The production line or conversion facility can revert back to stock car fender, grill and bumper components without difficulty. Because a large percentage of United States purchasers desire large cars for their secure and safe feeling, this system will enable a smaller car to look like a larger car and yet have an energy conserving power plant, and be lighter than a conventional car of comparable safety. In short, it is an energy conservation vehicle having crashworthiness, occupant safety and reduced damageability.

The auto manufacturers will be able to utilize the system profitably while simultaneously removing the safety inequities forced on the small car owner. The advantages listed are achieved at no extra cost to the owner so that the consumer, dealer and manufacturer benefit. Fire hazards in automobiles are also reduced by providing substantial additional defensive protection for gas tanks at speeds which comprise the majority of rearend accidents. The system provides a front end which is less aggressive towards other cars than automobiles of conventional construction.

DESCRIPTION OF PREFERRED EMBODIMENTS

As mentioned in the ASME publication identified above in the Background section, there are three fundamental factors which must be accounted for in the design of crashworthy systems. The factors are: (1) the amount of structure crush distance and energy management (or aggressivity) of the interior and exterior vehicle structure, (2) the time of effectiveness of occupant restraint or protection systems, and (3) the level of human injury tolerance. In addition to these consideration, one must also consider the important factor of load path transmissibility for the case of oblique impact and other conditions. Thus, there is a need for mass-produced automobiles which combine (a) lightweight, (b) sufficient body crush-deceleration distances, (c) means for efficient absorption of kinetic energy and (d) holding down accident repair costs for accidents which occur in the 10-30mph range. A basic approach is that there is no substitute for deceleration distance in the vehicle. Crushable extremities must also provide sufficient impact crush resistance to absorb optimum amounts of energy before occupant areas are intruded upon, before excessive G forces are exerted on the occupants, and before more expensive parts of the inner body and chassis are damaged. A bumper or bumper function is essential in any automobile but does not have to exist in the conventional form. However, it is not necessary to design low speed protection in such a way that it restricts the car's ability to absorb higher speed impacts efficiently and inexpensively. New designs, nevertheless, have to be compatable with the industry's present mass production systems and planned car models, otherwise improvements will never reach the consumer on an effective volume basis.

Figure 1:
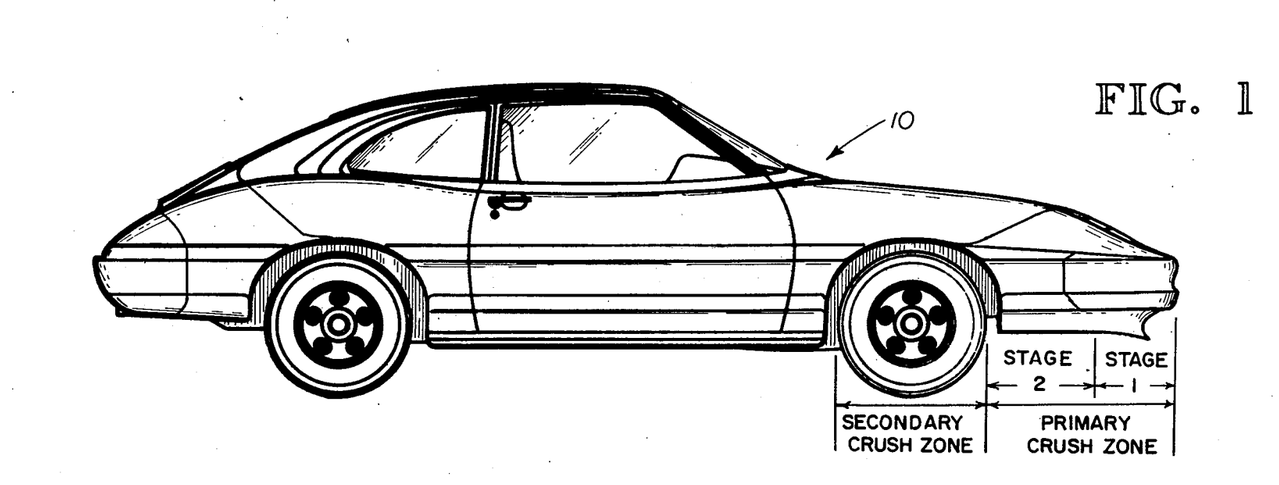
FIGS. 1 and 2 show a stock small car before and after its conversion to the inventive system.
Figure 2:
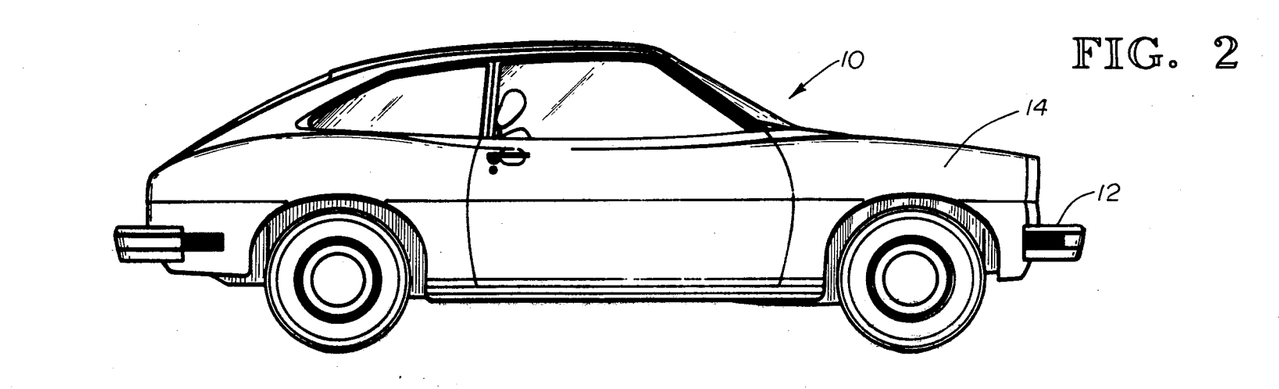

As mentioned above, FIG. 2 represents a typical small car. FIG. 1 shows the same vehicle equipped with the crashworthiness system of this invention. In FIG. 2, the inventive components replace conventional bumpers, bumper brackets, shock absorbers and decorative grill work as well as sheet metal or conventional hollow molded plastic sections on the ends of automobiles. It will also be noted particularly with reference to FIGS. 4 and 6 that the frame rails and/or conventional bumper bracket assemblies forward of the radiator are also eliminated as part of the process of preparing the automobile for the invention.

COMPONENTS

The basic components of the invention organized and structured into the instant controlled energy management, two-stage crashworthiness system, are a unique combination of energy absorbing foam, bulkheads and skins. Unlike others, this system emphasizes the use of the foam modules as the primary energy absorbing medium with rigid back-up members and skins to control the foam reaction to impacts. The energy-absorbing cellular modules inside the skin modules fill all or nearly all of the space inside the outer body skins. The foams employed are flexible, semirigid or rigid foams of open or closed cell composition. The foams are such that they exert relatively high compression resistances during early stages of impact compression, that is more than 20psi at 25% compression during compression-load-deflection (CLD) impacts occurring at 7'/sec on specimens 3" thick, 14 ft/sec on specimens 6" thick, etc. The preferred foams exert long, and as flat as possible CLD stress-strain curves. At 65% compression, the foams preferably exert resistances which are less than twice the resistances exerted at the 25% compression during CLD impacts. Additionally, the rate sensitivity should not exceed a gain of 10% in compression resistance at 25% of the compression stroke when the impact speed is increased from 20 to 40mph. While the above represents a preferred rate sensitivity, it should not in any event exceed a 1% increase for each 1 mph of additional speed or a ratio of 1% increase to 1mps of added speed. (Note: foams should vary in dynamic compression and at the lower end of the range should exceed 15psi at 25mph. For the maximum strain they should not exceed 110psi at 40mph.) The strain rate of the cellular material can be varied by chemical formulations and densities, in order to be compatible with the car's weight, deceleration stroke, and G-force limitations desired. These general dynamic compression standards are compatible with resistance properties set forth above. The foams must exert low rebound after impacts. As an example, rebound energy exceeding 25% of CLD impact energy will not be extensively usable. The flexible foams must substantially recover their original impact absorbing capacity and shape within a few minutes after impact in order to avoid repairs after low-speed collisions. Cellular, polymeric modules which recover their shape may be used in combination with rigid, non-recovering cellular modules in order to achieve a combination of no repairs after low-speed collisions, and high efficient energy absorption with quick-low-cost modular repairs in high speed collisions. Alternatively, the cellular materials for the stage 2 module could be replaced by aluminum or other metal, paper or plastic honeycomb material. The stage 2 foam could be somewhat weaker than the stage 1 foams in some instances. The outer bulkhead distributes the load through or across the stage 2 foam and the styling such as taper may allow for a greater mass of stage 2 foam. Nevertheless, the stage 1 module must do its work before the stage 2 module is brought into play. Flexible cellular materials are acceptable because of recent developments which enable them to absorb energy in an increasingly efficient manner over a wider range of temperatures while also increasing tensile and shear strengths. Their performance makes them acceptable as a replacement for rigids and semi-rigids.

The bulkheads may be metal or stiff plastic sheeting which may be flat but preferably are formed into corrugations. Those surfaces of the foam modules contacting the bulkheads should be shaped so that the contacting surfaces fit any corrugations and other offsets or surface irregularities closely during impacts. The corrugations are preferred in order to prevent sliding, and to promote rigidity and strength and to distribute the impact pressures uniformly. The bulkheads are designed to give way after the foam modules begin reaching their maximum compressibility where resistance to deflection begins to increase sharply. This enables relatively inexpensive, lightweight, space-saving bulkheads to withstand high pressure exerted by the energy-absorbing modules, particularly in collisions with narrow, invading vertical objects such as poles. As will be explained more in detail hereinafter the location of bulkheads and bulkhead bracing is an important aspect of this invention. Preferably a corrugated steel bulkhead is used made either of hot rolled, ultraform 80 or a cold rolled, dry, full hard annealed steel in the range of approximately 0.030 inches to 0.070 inches in thickness. Tensile strengths of the steel should run on the high side of 40,000 to 150,000 psi strength range. In other words, high tensile and sheer strengths are desirable. Again and as mentioned above, solid pastics, laminates, or stamped/pressed fibre reinforced plastics or other metals may be used insofar as their properties are utilized to establish the same strength relationships.

The outer body skin modules preferably are molded from tough, flexible polymers such as reaction injection molded (RIM) polyurethane, rubber, PVC or low density polyethylene. Thicknesses will vary from between about 0.050 inches to 0.450 or 0.500 inches at the maximum. Preferably the skins are about 0.10 inches thick not including the required mold flow radii or beading on the edges. The ultimate tensile strength of the skin should be at least 1500 psi. Elongation at break is preferred not to exceed 200% and it should have a high tear strength factor of at least 300 psi or better using ASTM #624 DIE "C" test. Additionally, the elastic flexural modulus should be no more than 200,000 psi using test #ASTM D790. The skins are designed to join each other at seams which may but do not necessarily coincide with divisions between cellular energy absorbing modules, and to overlap at the seams. This arrangement increases their ability to contain the cellular energy absorbing modules during collisions, besides having other advantages such as reducing the severity of skin crumpling during collisions by allowing some sliding-telescoping effect. It also simplifies quality control during assembly and helps keep out water. The skins would have slits, holes or a slash on the module undersides or flaps aimed rearwardly to minimize water absorption but also to allow rapid air escape during collision impacts to reduce any undesirable balloon effect. Bulkheads will also be vented for air escape and bleeding.

STRUCTURE AND ARRANGEMENT OF COMPONENTS

FIGS. 1 and 2 show a typical small or compact car 10 first in its standard or stock form. As is required by law, it includes a front five mile an hour bumper 12. As noted in the Background section, the lack of deceleration distance in that area forward of the front tires is the primary reason why small cars are unsafe. FIG. 1 shows the stock car of FIG. 2 as it would look after being converted to provide more deceleration to the primary crush zone which is, again, that portion of the automobile forward of the front tires. It will be noted in FIG. 2 that a fender panel 14 extends from in front of the front tire to well behind the front tire. The result of a low speed collision is to damage stock automobile components, namely at least the fender panel 14, so that damage is done through not only the primary but through the secondary crush zones. It will be noted in FIG. 1 that the primary crush zone from the forward part of the front tires to the tip of the automobile is divided into a stage 1 or low speed module and a second stage of higher speed energy absorbing module. As will be seen in subsequent discussion, lines demarking stage 1 from stage 2 will simply represent nominal division lines for the purposes of simplifying discussion although in principal and in structure the low speed and high speed or first and second stages are clearly differentiated.

Figures 3, 4, 5:
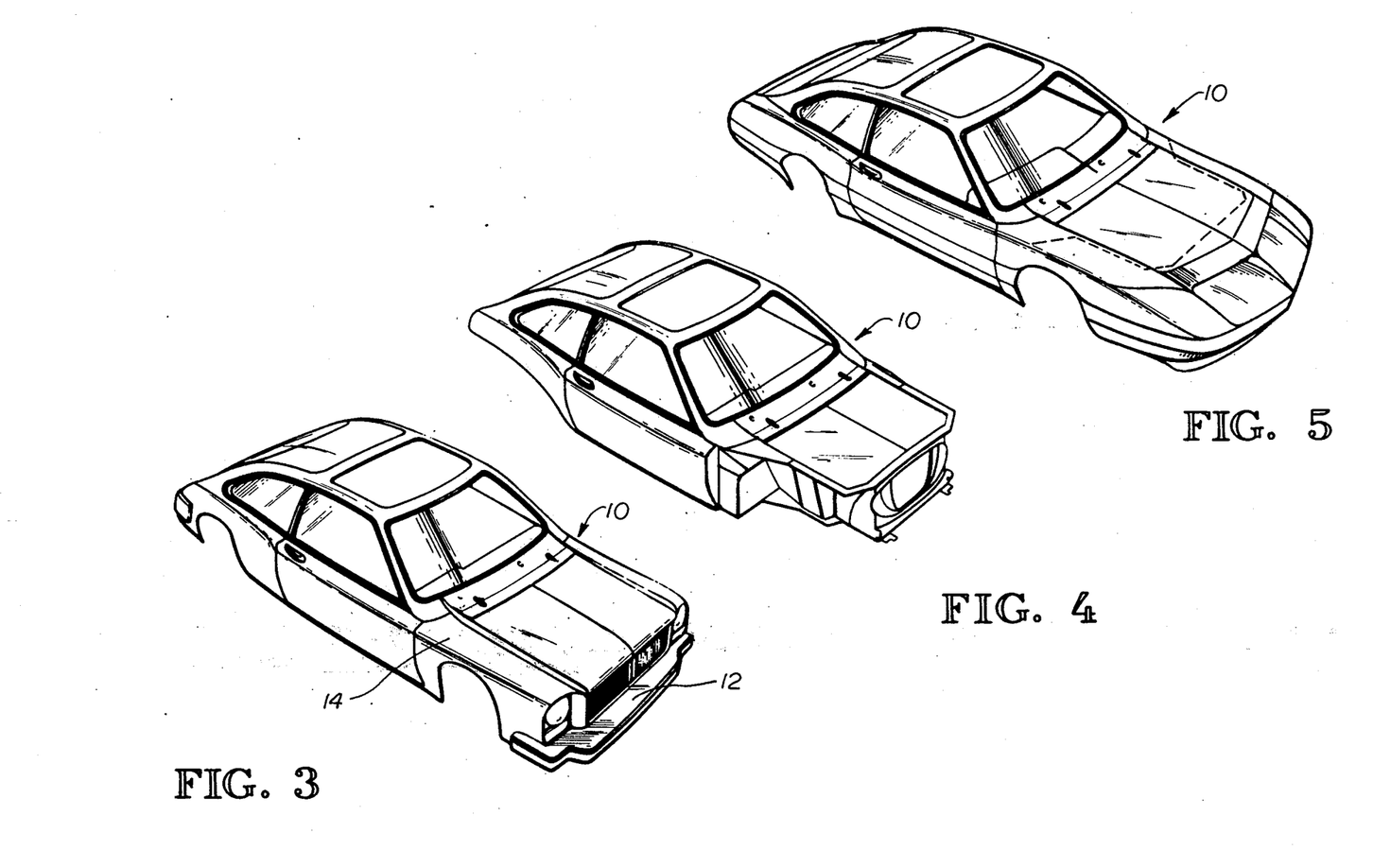
FIGS. 3, 4 and 5 show a small car stock body, the body stripped for conversion, and the body equipped with the system of this invention.

FIG. 3 shows the stock body 10 prior to its being ready for conversion. FIG. 4 shows the stripped stock car body ready for installation of the kinetic safety vehcile (KSV) crashworthiness conversion system. The frame rails and bumper brackets in front of the radiator have been eliminated. Also the outlines of the reference stripped down automobile 10 have been simplified for the purposes of this discussion since various makes of cars will have subtle structural distinctions the detailing of which is not important to an understanding of this invention.

Figure 6:
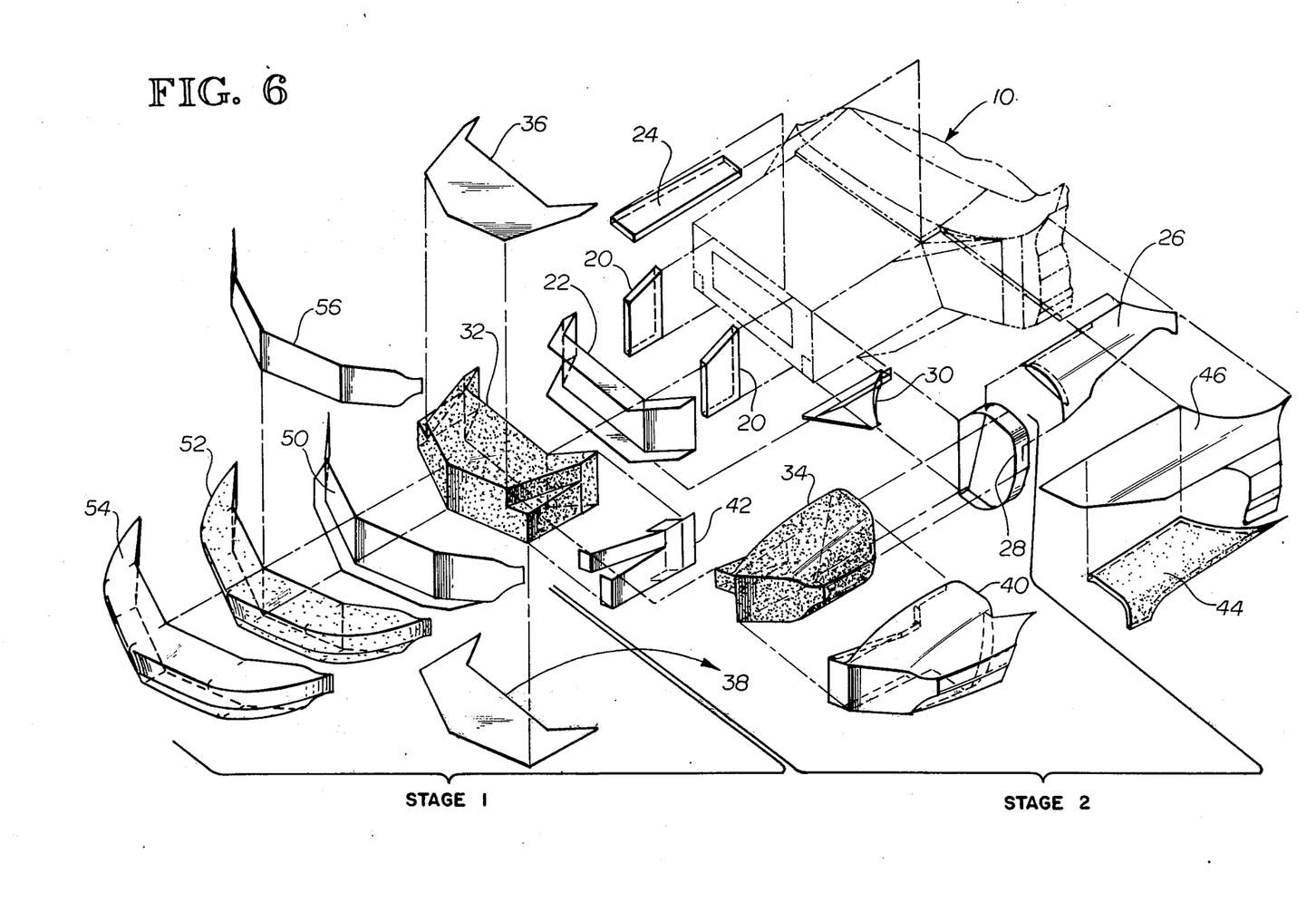
FIG. 6 is an exploded view of the front end components to illustrate details of particular components and their location in the system.

The stage 2 structure, that is the high speed, crashworthiness module, consists of vertical braces 20 which attach to the front of the vehicle to support the stabilizer bulkhead 22. Attachment of mountings 20 may be conventional means such as bolts or welds. Bulkhead 22 will at various times be referred to as the stabilizer bulkhead and as can be appreciated will be an extension of the automobile. The vertical braces 20 space the stabilizer bulkhead 22 sufficiently forwardly of the radiator R to allow air to gain access. In addition, longitudinal bracing member 24 will be placed at the top of the engine compartment on both sides, as will a longitudinal fender bracing member 26. Essential to the concept of this invention is a wheel well or fender bulkhead 28 generally vertically disposed but tipped back at an angle at the top as can be seen in the various views. A bottom fender well brace 30 is disposed at the forward lower corner of the fender well as an additional support for the fender bulkhead 28 and the front vertical spacer brace 20.

It is to be noted particularly with respect to the upper fender brace 26 that it is not an external or exposed part of the body but rather a structural member for the KSV system. However, it is to be understood that the upper fender brace 26 could very well also serve as the outer body skin in that area. The stage 2, high-speed section of the invention has a center foam module 32 which is shaped to conform to stabilizer bulkhead 22, and to corner or fender high speed foam modules 34. In addition, the center high-speed module 32 has upper skin 36 and lower skin 38, which because of the exploded nature of FIG. 6 is shown to be in the Stage 1 area but is in fact a part of stage 2. The corner or fender foam module has skin 40. Attached to the stabilizer bulkhead 22 are side brace members 42 which attach to the stabilizer bulkhead 22 and/or to the front side edge of the engine compartment wall for supporting the outer, stage 1, low speed bulkhead 50. Side braces 42 thus connect the outer bulkhead 50 the other rigid elements of stage 2 so that the entire crashworthiness system is supported as a rigid extension of the front of the automobile. It will be appreciated that a foam pad 44 will be placed over upper fender brace 26 and then covered by skin 46. A unique aspect of the invention is the stabilizing structure defined by the bulkhead components so that the front of the automobile remains stable and free of road jounce such as might be produced by ruts, vibration, or a person standing or jumping on the body. Simultaneously, it provides a longer stroke than previously obtainable with foam which was completely encased longitudinally in a metal box beam-like structure. The principle of controlling the foam may be further understood by reference to FIGS. 6, 12, 18 and 21 where it can be seen that the foam is cupped or trapped whether the collision or impact is frontal or at an angle.

With such an integrated structure from the car chassis to bulkhead 50, the high speed stage 2 foam modules 32 and 34 may be flexible as well as semi-rigid or rigid cellular materials. In most instances with front engine vehicles, the stabilizer bulkhead will be forwardly offset of the fender bulkheads 28. It is to be appreciated that the system applies whether the engine is mid or rear body. Thus as can be seen particularly with reference to FIGS. 6-9 and 21, the invention is designed for oblique or angular or offset vehicle corner collisions as an important part of the system concept.

The stage 1 components are comprised of the outer bulkhead 50, low speed foam module 52, skin 54, and an auxiliary backup skin 56. In this way, the low speed, stage 1 foam module 52 is entirely contained for separate removal and detachment to and from the stage 1 bulkhead 50. Note that the cellular material of low speed foam module 52 will be flexible. The stage 1 module will have a crashworthiness capability of up to about 5 to 10 mph (BEV). The high speed module will have a crashworthiness capability from 10 to 17 mph (BEV) or from 20-34 mph car frontal with one car at rest before the stock inner body structural members and passenger compartment begin to damage.

Figures 7, 8, 9:
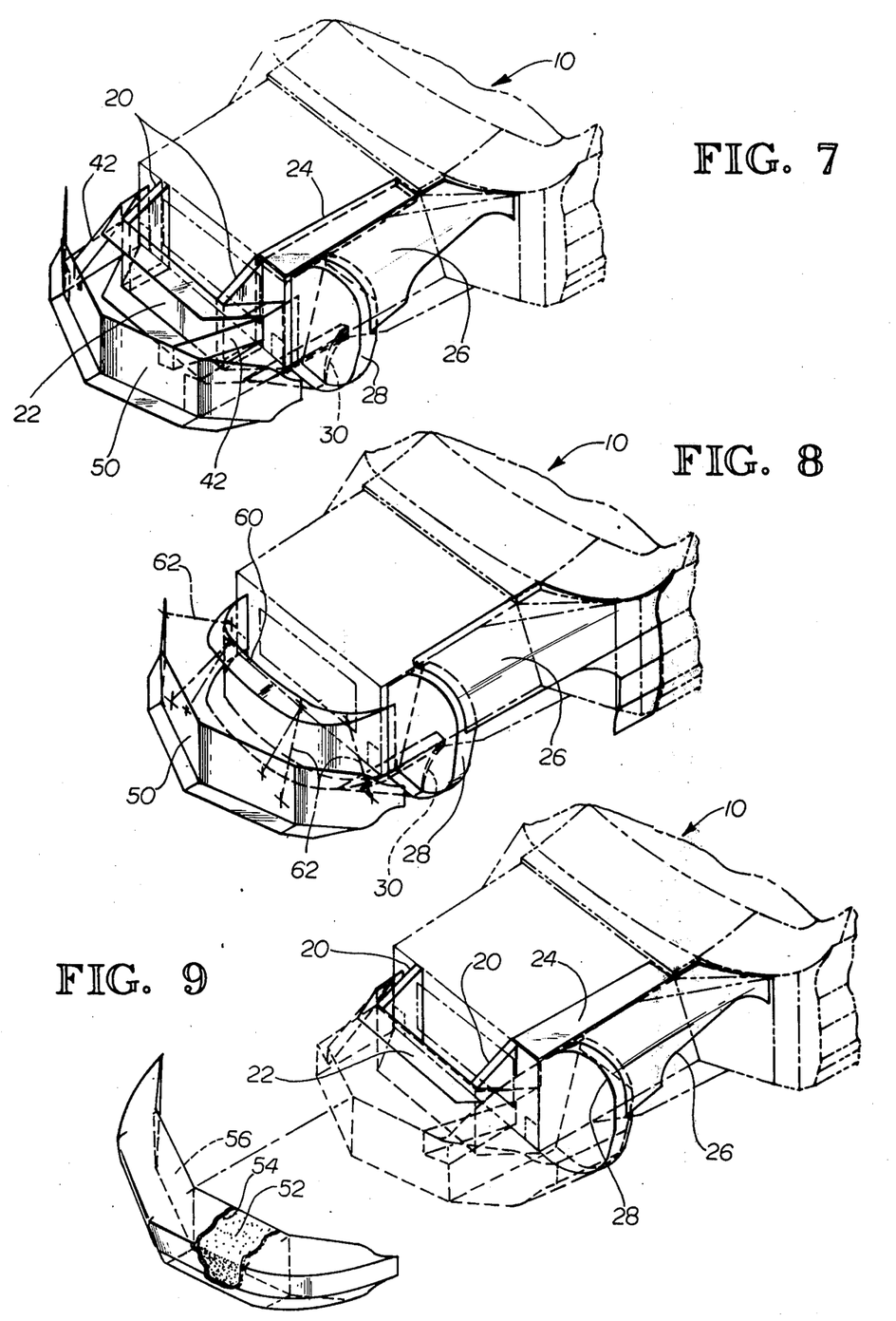
FIG. 7 shows additional details of the bulkhead components assembled on the front of the vehicle.
FIG. 8 shows an alternative embodiment of the system bulkheads.
FIG. 9 shows details of the foam utilized with the bulkheads.

FIG. 8 shows an alternative form of the stabilizer bulkhead 60 in which it attaches at its outer ends and is shaped so as to attach to the forward outer sides of the vehicle chassis. Bulkhead 60 may, if desired, also have vertical support members as shown in the preferred embodiment. In this particular alternative embodiment, outer bulkhead 50 is attached by tension mounting elements 62. In this particular embodiment, the center high speed foam module 32 will be either semi-rigid or rigid.

Figure 10:
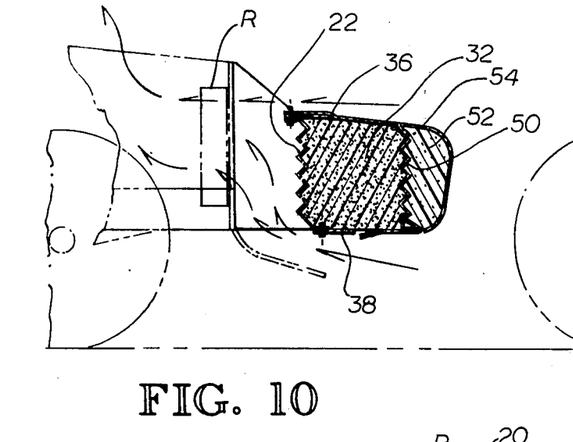
FIG. 10 is a partial cross-section view through the center of the front portion of a vehicle showing details of the invention.
Figure 11:
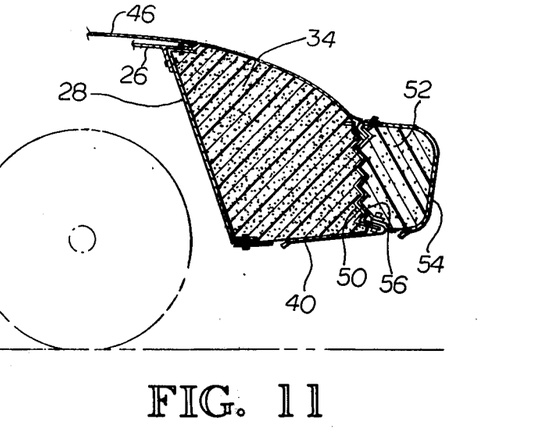
FIG. 11 is a partial section through the centerline a fender area to show details of construction.
Figure 13:
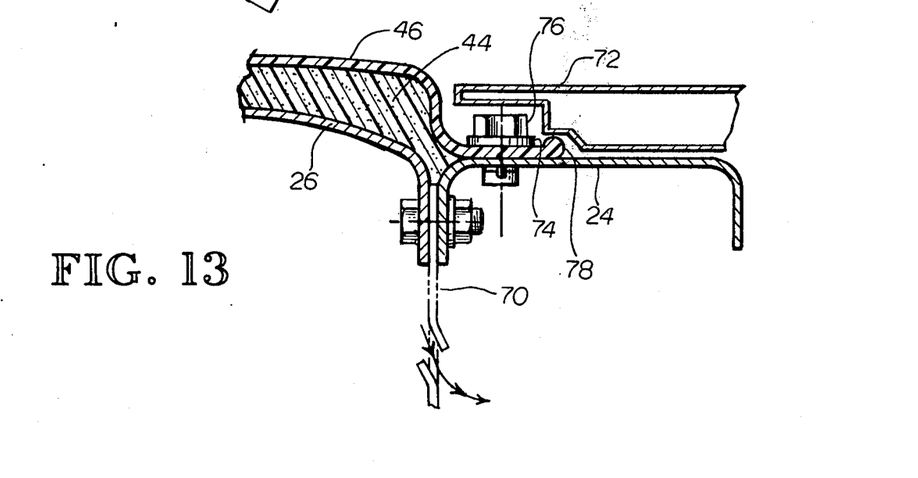
FIG. 13 is a partial cross-section view at the upper edge of a motor compartment side wall showing details of the manner in which a skin would be attached to vehicle components.

FIG. 10 is a partial cross-section view through the centerline of the automobile to further show details of the system with the preferred corrugated form in the stabilizer bulkhead 22 and in the outer bulkhead 50. The lower center skin 38 is vented for purposes described above. Also the bulkheads will be vented for air bleeding or release. The same is true, of course, of low speed module skin 54. FIG. 11 is a partial cross-section view taken along a longitudinal centerline through the fender area. For the purposes of discussion, the centerline of the fender area will be considered a line approximately through the center of the transverse dimension of fender bulkhead 28. It shows the stage 2, high speed foam module 34 with the centerline extending through the low speed module 52. FIG. 13 is included to show the manner in which skins may be attached. For instance, side engine compartment wall 70 has connected to it the longitudinal fender brace 26 as well as the upper longitudinal engine compartment brace 24. The automobile hood is shown as at 72. In this particular instance, fender skin 42 is attached as by a cap strip 74 and nut and bolt 76 just inside bead 78 of the skin.

It is important to keep in mind that there is a preferred ratio of longitudinal depth of the two stages to each other. Whether a longitudinal section line is taken through the center of the automobile or through the centerline of the fender area, the stage 1 or low speed module is usd as a frame of reference of 1. The high speed stage 2 module may be from one-half to two and one-half times the longitudinal depth of the low speed module depending on where the measurement is taken. Expressed in dimensional ranges, the stage 1 module will be from 4 to 12 inches in longitudinal depth. The stage 2 module will be from 4 to 24 inches deep through the center foam module 32 and from 4 to 36 inches deep through the fender module 34. It should be noted that the measurement of the stage 2 fender longitudinal dimension begins nominally with a vertical plane passing tangent to the front of the front tires, or rear of the rear tires. The system herein shown is primarily designed for an automobile capable of withstanding from 40 to 60 G's from the fire wall rearwardly into the occupant or passenger compartment, but it is to be understood that the system could obviously be incorporated in vehicles designed for higher or lower G loading. The vehicle G's are to be distinguished from occupant G's which will vary depending on whether the passenger is belted or unbelted or restrained by other means. As stated above, the bulkheads are designed to give way after the foam preceding them reaches or begins to reach the limits of its compressibility curve to the point where its resistance begins to increase sharply. Where the foam has reached its maximum compression, the bulkheads will then begin to give way but successively through the system so that the desired deceleration distance is utilized. As mentioned above, the stage 1 module must complete its work before the stage 2 module becomes functional.

Figure 20:
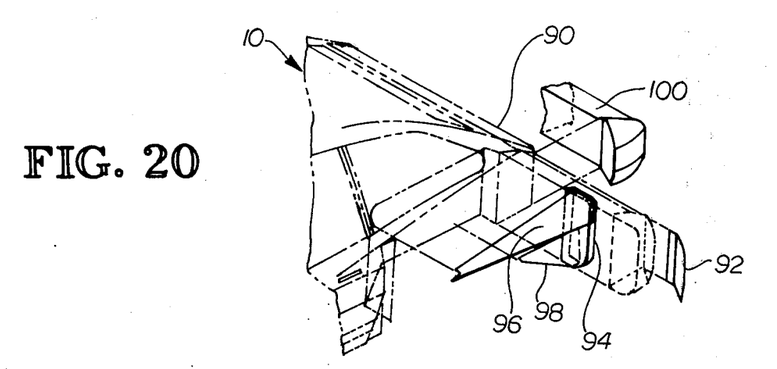
FIG. 20 is a partial view in perspective showing details of system construction at the rear of an automobile.
Figure 21:
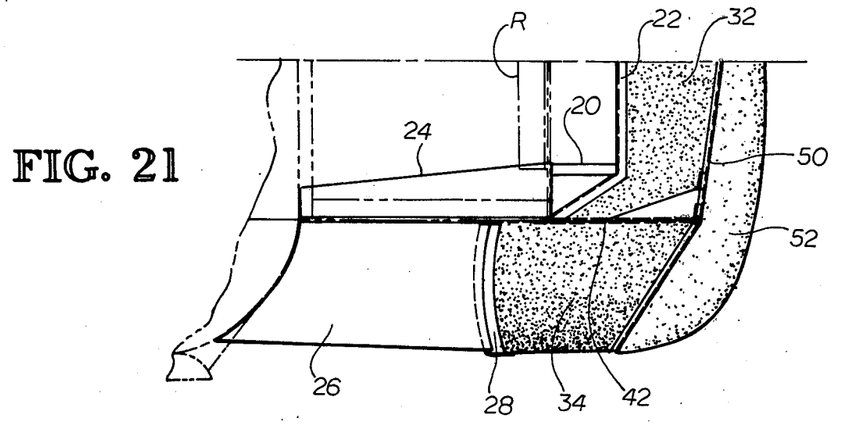
FIG. 21 is a partial plan view of the details of FIGS. 6 and 7 to further assist in details of construction.
Figure 22:
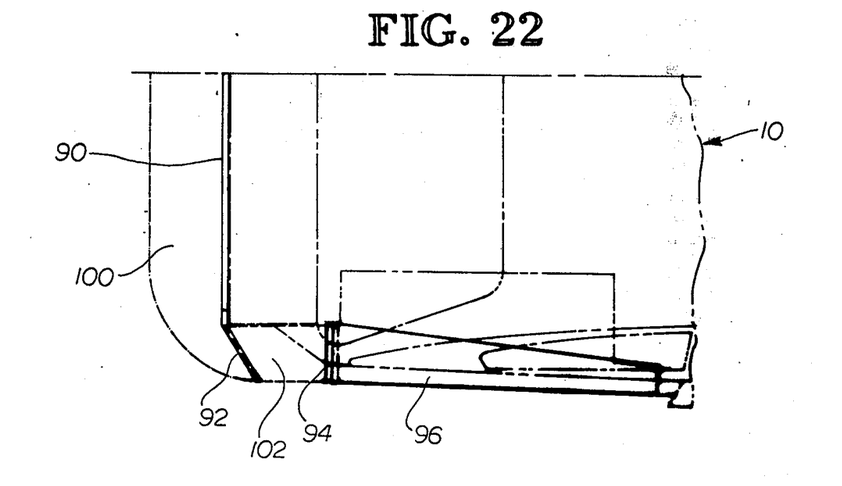
FIG. 22 is a partial plan view of the rear of a vehicle in accordance with the details of FIG. 20.

FIGS. 14–17 are illustrative of alternative embodiments of the invention, in which the low speed module having skin 54 is attached directly to the stabilizer bulkhead 22. In this form, and as with the rear of the automobile as shown in FIGS. 20 and 22, the corners of the vehicle still are protected by a two stage system although the center is protected only by stage 1. Thus the low speed module attaches directly to the stabilizer bulkhead 22 which has wings 23 extending generally outwardly nearly to the outer edge of the vehicle. The stage 2 foam module 34 with skin 40 is located behind the wing 23 of the stabilizer bulkhead and, of course, in front of the fender well bulkhead 28. Thus, and as stated above, the corners of the vehicle are provided with both low and high speed modules but the center area is protected only by the low speed module.

Figure 14:
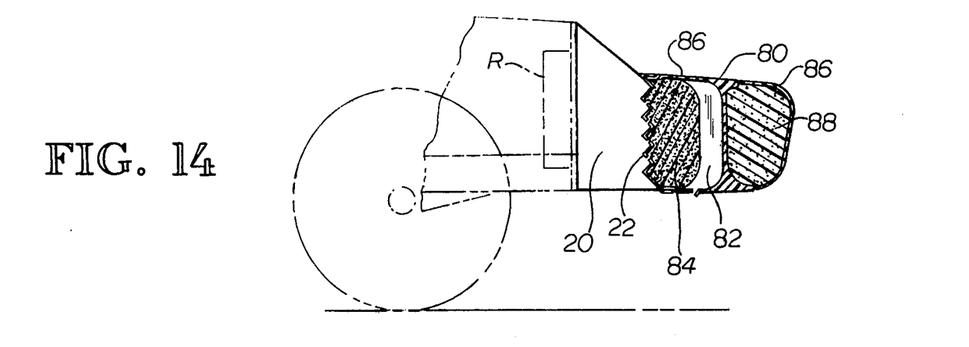
FIG. 14 shows an alternative embodiment through the centerline of the vehicle to a two stage module.
Figures 15, 16, 17:
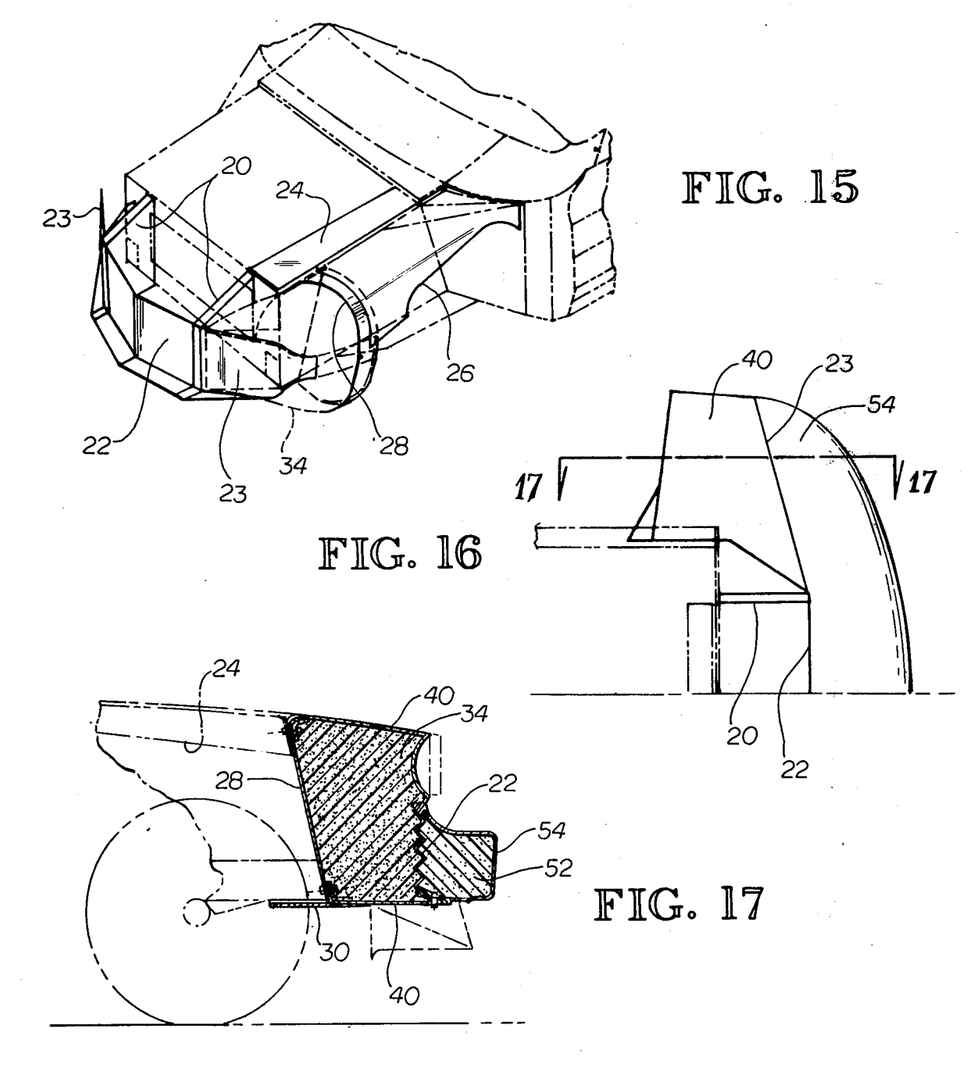
FIG. 15 shows details of an alternative embodiment of system construction.
FIG. 16 is a bottom plan view of the embodiment of FIG. 15 showing seam lines for the skin sections of the system.
FIG. 17 is a partial cross-section view through a fender centerline to further illustrate details of construction.

FIG. 14 shows an alternative embodiment of a full two stage system in which the outer bulkhead has been replaced by a strong plastic bulkhead 80 with interior rib 82 and a high speed cellular material or foam energy-absorbing medium 84. The stage 2 module has skin 86 which attaches to the stabilizer bulkhead 22. In like manner, the stage 1 module has skin 86 and low speed flexible foam 88. The details of the corner construction would be nearly identical to the form of the invention described above.

FIGS. 20 and 22 show the system applied to the rear of an automobile. Vehicle 10 has rear vehicle line 90 from which the bumper and bumper forks have been removed. At each of the outer ends of the trunk compartment wall 90 are attached wing members 92 which function on the corner as stage 1 bulkheads. The fender well bulkhead 94 is located, of course, inwardly of the stage 1 bulkhead 92 and the stage 2 bulkhead 94 has an upper brace 96 and a lower brace 98. Stage 1 foam or module 100 is attached to the rear 90 of the vehicle across its width and to stage 1 bulkheads 92. Stage 2 foam module 102 is positioned between the stage 1 bulkhead and the fender well or stage 2 bulkhead. Skins are provided and attached as above. If the car has a front end luggage compartment, the wall thereof will like the truck wall act as a bulkhead.

Figure 12:
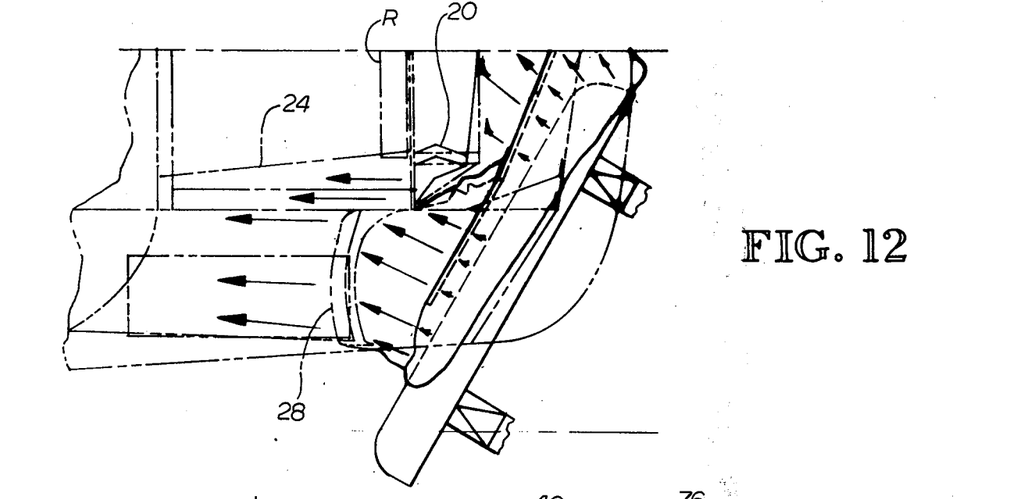
FIG. 12 is a partial plan view showing the system in phantom and illustrating the transmission of forces from an invading object such as another car bumper hitting the converted vehicle at an angle.
Figure 18:
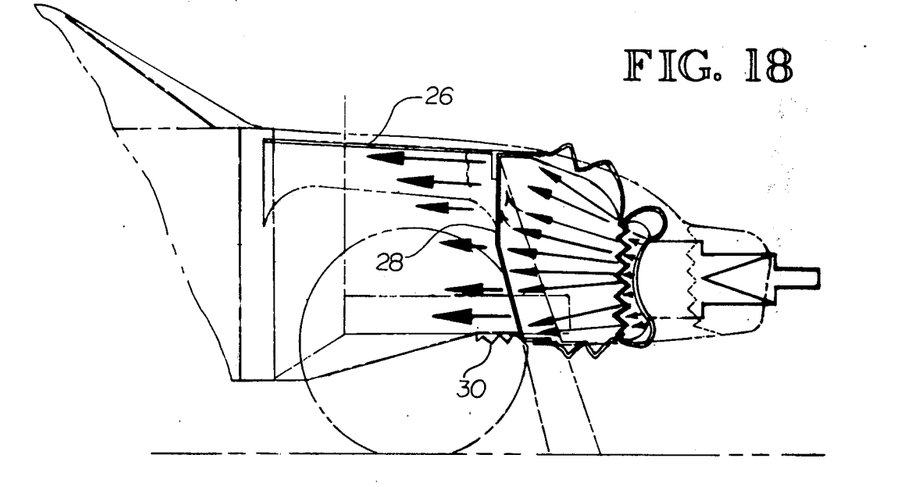
FIGS. 18 and 19 schematically illustrate the transmission of forces during an impact.

FIGS. 12 and 18 show how an invading object such as the bumper of another car results in the forces of the impact being spread as evenly and as widely as possible through the system and through the stock vehicle body. Accordingly, it can be seen that the bracings as well as the components of the stage 1 and stage 2 modules are important to establish the force transmissibility paths over as wide an area and through it as many components as possible so as to allow for the maximum absorption of impact kinetic energy. In composite FIG. 18 for example, it can be seen that the stage 1 module has compressed to its complete allowable limit after which the second stage module has reached approximately 50% of its stroke. It also illustrates the position of the lower fender bulkhead area and the brace 30 after the foam module has reached its full compression. In this way, it can be seen that the impact forces are distributed not only horizontally but multi-directionally by the system.

Figure 19:
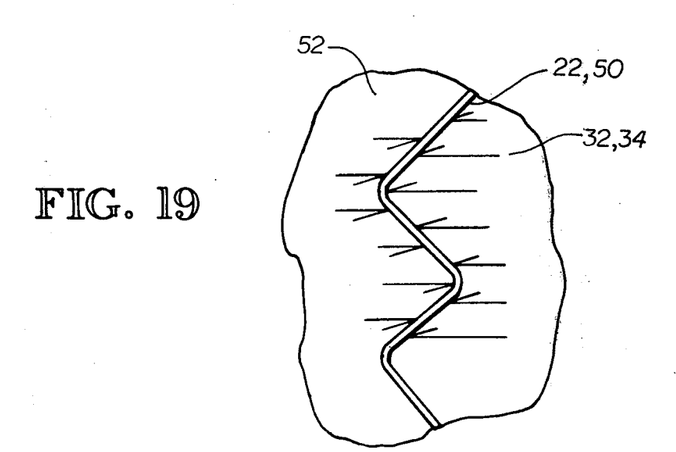
Figure 23:
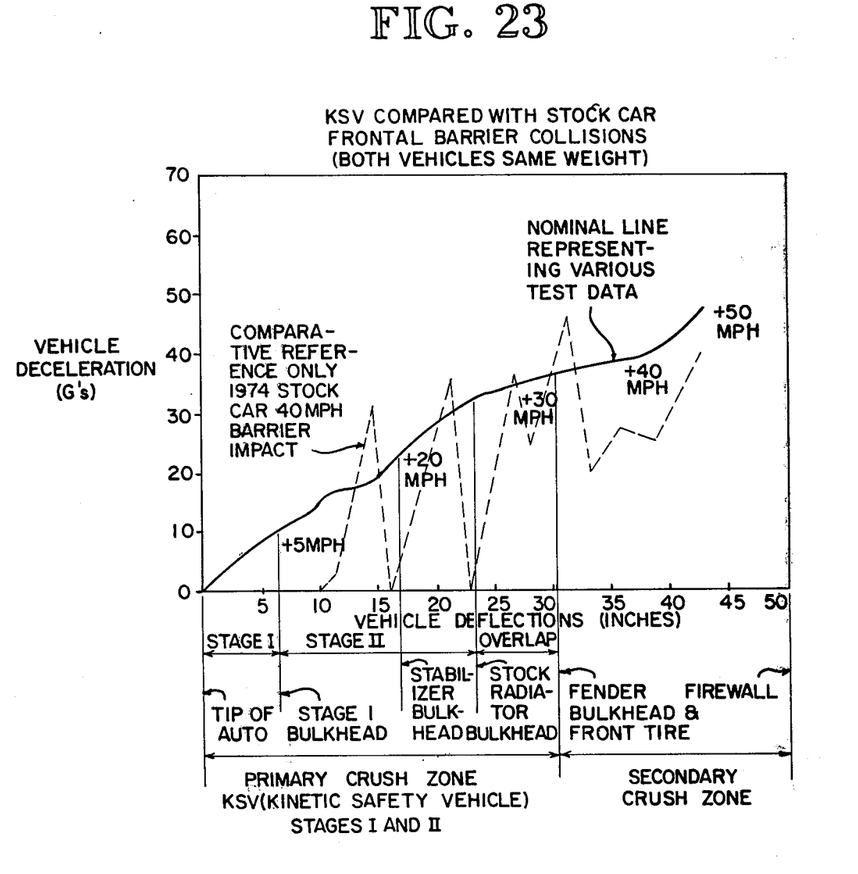
FIG. 23 is a graph further illustrating features of the invention.

FIG. 19 illustrates graphically that under impact pressure the squeeze on a bulkhead adds to its rigidity and helps preserve its original shape. FIG. 23 shows the deceleration curve of a stock compact (dash line) to a solid line which represents a similar compact or subcompact with the KSV system installed. The nominal range represents a range of deceleration performance and will vary somewhat according to car weight, speed and strengths of the foam and substructures. To absorb a given amount of energy the nominal line must be raised with stiffer foam and substructure when a reduction in deceleration distance (shorter front end) is required thus, raising the "G's". Conversely, a longer KSV front end allows the system to be made weaker thus lowering the "G" loading. The nominal line shown in the secondary crush zone and the front tire/stock radiator bulkhead overlap section is obtained by modifying the car's stock structure. However, the modifications required to achieve a smooth curve in this secondary area are up to the manufacturer. This can be accomplished by altering the frame rails or providing a means of rotating the engine and wheels out of the crush zone during high speed collisions. The instant invention is primarily a means of improving performance ahead of the wheels, as it is the least expensive and most practical approach. The flex skins of this system and its metal structures work synergistically with the cellular materials to increase the energy absorbing capabilities of the entire system beyond that which can be accomplished in present conventional methods. As an alternative to the inner energy absorbing medium and the skin being separate, it may be advantageous to adhere the foam to the skin. It might then be a one piece unit that could then be secured to the vehicle without the skin being attached to bulkheads or stock body components. Likewise it may be possible to develop a self-skinning foam which produces a skin tough enough to meet engineering criteria while at the same time being acceptable from an energy management standpoint. It can be appreciated that the fender can be one piece of either flexible or rigid material. In both cases the collision damage would cost more to repair as compared to a two piece fender where the skin over the 2nd stage portion of the primary crush zone is replaced as part of the modular system.

What is claimed is:

1. Modular, impact energy-absorbing system for the front and/or rear ends of automobiles in which bumpers, fenders and other structures generally outwardly of the engine and/or truck compartments are eliminated or not provided and which is designed for frontal and corner collisions, comprising:
    (a) first generally vertically disposed transverse bulkhead means extending generally at least across the width of the automobile engine and/or truck compartments;
    (b) second transverse generally vertically disposed bulkhead means for each wheel well located outwardly of the tires and secured to the automobile body and forming a high speed bulkhead;
    (c) third generally vertically disposed bulkhead means located longitudinally outwardly a predetermined distance from and extending at least generally across the transverse dimension of said first bulkhead means and operatively interconnected with said first bulkhead means and forming a low speed bulkhead;

(d) energy absorbing first module of cellular material located in and substantially filling the area forwardly of said second bulkhead means, and filling the area between said first and third bulkhead means, said first module together with at least said second bulkhead means comprising a high speed collision energy-absorbing stage of predetermined longitudinal dimensions;

(e) energy absorbing second module of cellular material extending transversely across substantially the entire width of said automobile and being attached at least to said third bulkhead means and together with said third bulkhead means forming a low speed collision energy-absorbing stage of predetermined longitudinal dimensions; and (f) separate external flexible skin means enveloping each of said energy absorbing modules over those surfaces thereof not contacting or abutting body, frame and bulkhead components, said skins being attached to said body, frame or bulkhead components and which together with said first and second cellular material modules and said first, second and third bulkhead means forms a controlled, successive, two-stage, energy management system having a predetermined body-crush deceleration distance.

2. The modular, impact energy-absorbing system according to claim 1 and in which said first bulkhead means is attached to and supported by the body in spaced relation to the automobile radiator.

3. The modular, impact energy-absorbing system according to claim 2 and in which said first and third bulkhead means angle longitudinally rearwardly from the automobile centerline toward the body so as to provide additional protection for the automobile corners against angle collisions.

4. The modular, impact energy-absorbing system according to claim 1 and in which said second bulkhead means is inwardly offset of said first bulkhead means.

5. The modular, impact energy-absorbing system according to claim 1 and in which said third bulkhead means extends across substantially the entire width of said automobile.

6. The modular, impact energy-absorbing system according to claim 1 and in which said first module extends across substantially the entire width of said automobile.

7. The modular, impact energy-absorbing system according to claim 1 and in which said second bulkhead means also has upper and lower bracing means between itself and the automobile inner body.

8. The modular, impact energy-absorbing system according to claim 7 and in which the upper bracing for said second bulkhead means also serves as the outer body skin.

9. The modular, impact energy-absorbing system according to claim 1 and in which said automobile is provided with bracing means for the upper part of its engine compartment.

10. The modular, impact energy-absorbing system according to claim 1 and in which said first bulkhead is at least partially supported by vertical brace members secured to the automobile radiator wall.

11. The modular, impact energy-absorbing system according to claim 1 and in which the ratio of longitudinal dimensions is from about 1 for said low speed stage to about ½ to 2½ for said high speed stage.

12. The modular, impact energy-absorbing system according to claim 1, and in which said low speed stage in longitudinal dimension measures from about 4" to 18" and said high speed stage longitudinally measures from about 4" to 36".

13. The modular, impact energy-absorbing system according to claim 1 and in which said first and third bulkhead means are interconnected by rigid support means for rigid stabilization.

14. The modular, impact energy-absorbing system according to claim 1, and in which said first bulkhead means is generally transversely aligned with said second bulkhead means.

15. The modular, impact energy absorbing system according to claim 1 and in which said first bulkhead means is confined generally to the transverse area in front of the radiator and engine compartment.

16. Modular, impact energy-absorbing system for the front or rear end of automobiles in which bumpers, fenders and other structures generally outwardly of the engine or trunk compartment are eliminated or are not provided and which is designed for frontal and corner collisions, comprising:

(a) first generally vertically disposed transverse bulkhead means extending generally at least across the width of the automobile engine or trunk compartment;

(b) second transverse generally vertically disposed bulkhead means for each wheel well located outwardly of the tires and secured to the automobile body and forming a high speed bulkhead;

(c) energy absorbing first module of cellular material located in and substantially filling the area forwardly of said second bulkhead means, said first module together with at least said second bulkhead means comprising a high speed collision energy-absorbing stage of predetermined longitudinal dimensions;

(d) energy absorbing second module of cellular material extending transversely across substantially the entire width of said automobile and being attached at least to said first bulkhead means and together with said first bulkhead means forming a low speed collision energy-absorbing stage of predetermined longitudinal dimensions; and (e) separate external flexible skin means enveloping each of said energy absorbing modules over those surfaces thereof not contacting or abutting body, frame and bulkhead components, said skins being attached to said body, frame or bulkhead components and which together with said first and second cellular material modules and said first and second bulkhead means forms a controlled, successive, two-stage, energy management system having a predetermined body-crush deceleration distance.

17. The modular, impact energy-absorbing system according to claim 16 and in which said first bulkhead means is attched to and supported by the body in spaced relation to the automobile radiator.

18. The modular, impact energy-absorbing system according to claim 17 and in which said first bulkhead means angles longitudinally rearwardly from the automobile centerline toward the body so as to provide additional protection for the automobile corners against angle collisions.

19. The modular, impact energy-absorbing system according to claim 16 and in which said second bulkhead means is inwardly offset of said first bulkhead means.

20. The modular, impact energy-absorbing system according to claim 16, and in which said second module extends across substantially the entire width of said automobile.

21. The modular, impact energy-absorbing system according to claim 20 and in which said first transverse bulkhead means extends across substantially the entire width of said automobile.

22. The modular, impact energy-absorbing system according to claim 16 and in which said second bulkhead means also has upper and lower bracing means between itself and the automobile inner body.

23. The modular, impact energy-absorbing system according to claim 22 and in which the upper bracing for said second bulkhead means also serves as the outer body skin.

24. The modular, impact energy absorbing system according to claim 23 and in which said second bulkhead means is inwardly offset of said first bulkhead means.

25. The modular, impact energy-absorbing system according to claim 16 and in which said automobile is provided with bracing means for the upper part of its engine compartment.

26. The modular, impact energy-absorbing system according to claim 16 and in which said first bulkhead is at least partially supported by vertical brace members secured to the automobile radiator wall.

27. The modular, impact energy-absorbing system according to claim 16 and in which the ratio of longitudinal dimensions is from about 1 for said low speed stage to about ½ to 2½ for said high speed stage.

28. The modular, impact energy-absorbing system according to claim 16 and in which said low speed stage in longitudinal dimension measures from about 4" to 18" and said high speed stage longitudinally measures from about 4" to 36".

29. The modular, impact energy-absorbing system according to claim 16, and in which said first bulkhead means is generally transversely aligned with said second bulkhead means.

30. The modular, impact energy absorbing system according to claim 16, and in which said first bulkhead means is confined generally to the transverse area in front of the radiator and engine compartment.

31. Modular, impact, energy-absorbing system for the front or rear end of automobiles in which bumpers, fenders and other structures generally outwardly of the engine or trunk compartment are eliminated or are not provided and which is designed for frontal and corner collisions, comprising:
 (a) first generally vertically disposed transverse bulkhead means extending generally at least across the width of the automobile engine or trunk compartment;
 (b) second transverse generally vertically disposed bulkhead means for each wheel well located outwardly of the tires and secured to the automobile body;
 (c) energy absorbing module of cellular material extending transversely across substantially the entire width of said automobile and being attached at least to said first bulkhead means and together with said first and second bulkhead means forming a low speed collision energy-absorbing stage of predetermined longitudinal dimensions; and
 (d) separate external flexible skin means enveloping each of said energy absorbing modules over those surfaces thereof not contacting or abutting body, frame and bulkhead components, said skins being attached to said body, frame or bulkhead components and which together with said cellular material module and said first and second bulkhead means forms a controlled energy management system having a predetermined body-crush deceleration distance.

32. The modular, impact energy-absorbing system according to claim 31, and in which said first bulkhead means and said second bulkhead means are generally transversely aligned.

* * * * *